J. G. V. LANG.
CONTROL OF ELECTRIC MOTORS.
APPLICATION FILED NOV. 14, 1907.
1,025,876.
Patented May 7, 1912.
3 SHEETS—SHEET 3.
Fig. 4.
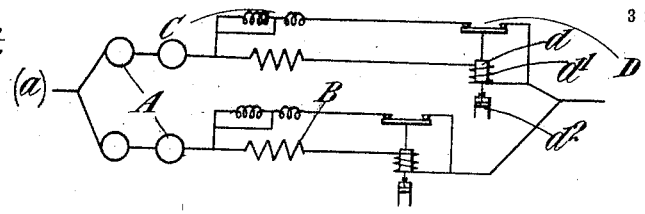
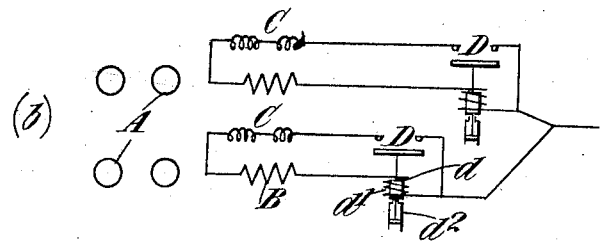
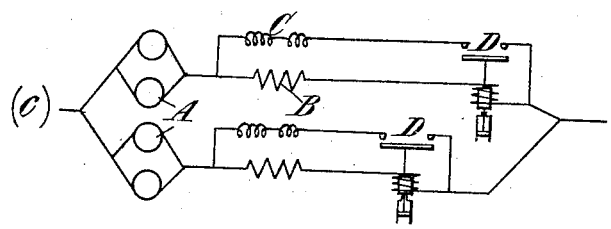
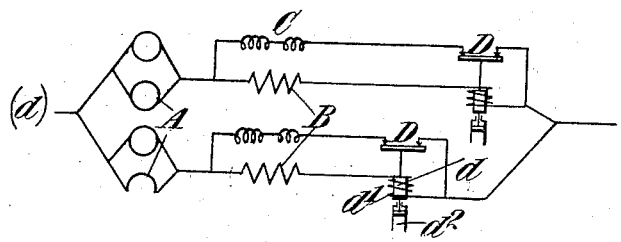
Fig. 5.
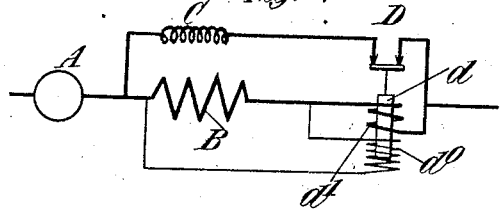
Fig. 6.
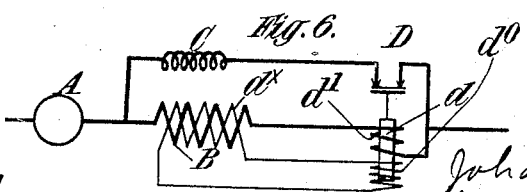
Witnesses:
H. F. Keating
W. Van Salisbury
Inventor.
Johan Gustaf Viktor Lang
By his Attorney
Charles J. Kintner

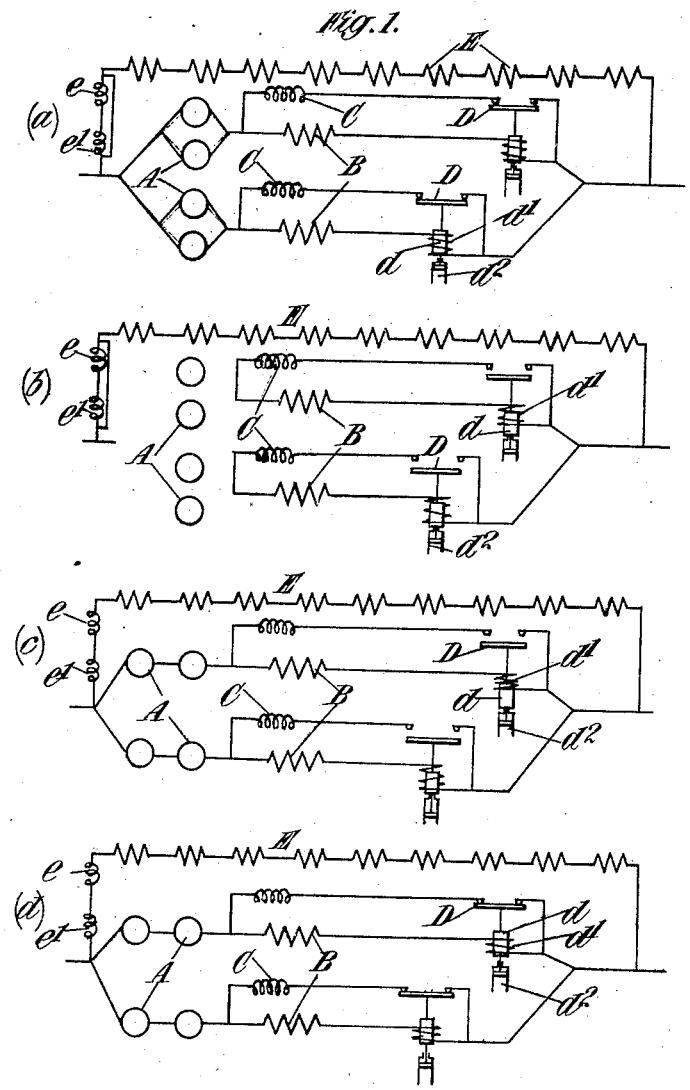

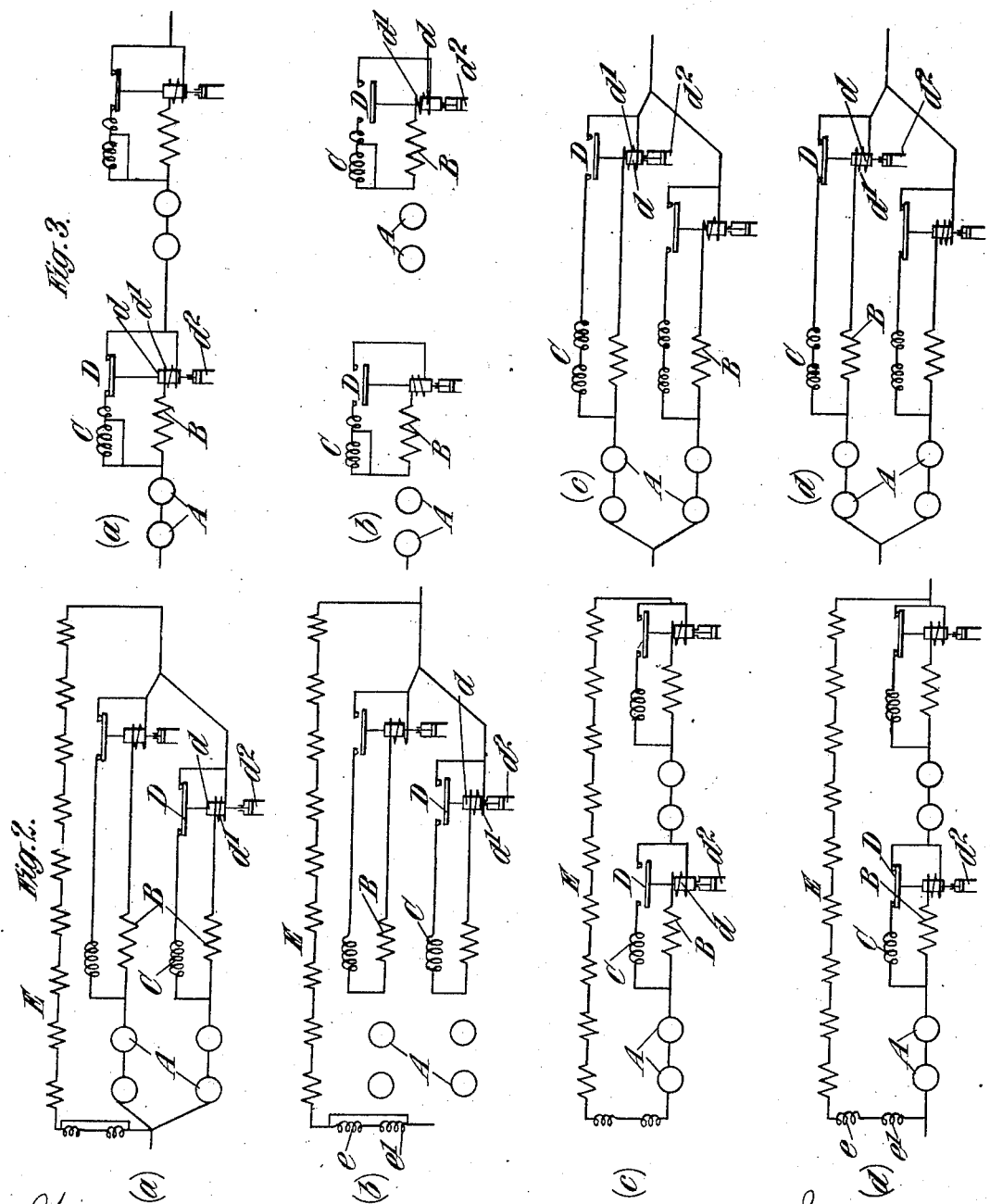

UNITED STATES PATENT OFFICE.

JOHAN GUSTAF VIKTOR LANG, OF SOUTHALL, ENGLAND, ASSIGNOR OF ONE-HALF TO EDWARD HIBBERD JOHNSON, OF LONDON, ENGLAND.

CONTROL OF ELECTRIC MOTORS.

1,025,876.  Specification of Letters Patent.  Patented May 7, 1912.

Application filed November 14, 1907. Serial No. 402,134.

*To all whom it may concern:*

Be it known that I, JOHAN GUSTAF VIKTOR LANG, a subject of the King of Sweden, residing at Spencer street, Southall, in the county of Middlesex, England, have invented certain new and useful Improvements in or Relating to the Control of Electric Motors, of which the following is a specification.

This invention has reference to the control of electric motors, and relates particularly although not exclusively to electric motors of the kind that are used for the propulsion of road vehicles and that work on what is known as the regenerative system of control.

The chief object of the invention is to overcome the disadvantages that arise in connection with the variation of the field strength of the motors by resistances arranged in shunt relationship with the series windings. These resistances are generally non-inductive and can only be made inductive to any considerable degree as compared with the field of the motors, by employing masses of iron whose dimensions are far too great for use with electrically propelled vehicles in which undue weight of the equipment has to be avoided. The disadvantage of the non-inductive or slightly inductive resistance in shunt with a series field winding is, that whenever the circuit through the motors is temporarily broken and then closed again, (as for instance during the change of relationship of the armatures in series-paralleling by open circuit control, or when the trolley leaves the conductor and regains connection therewith) the rush of current that occurs on the completion of the circuit is considerably greater when the shunt resistance is in circuit than if such shunt resistance were not in circuit at all. This is because most of the current then passes through the shunt resistance on account of its non-inductivity and because no other limitation for the rush of current exists but that which is due to the ohmic resistance of the armature windings and of the shunt paths. If however the shunt paths did not exist, the rush of current would be compelled to pass through the field windings and energize the field, thereby causing a counter electro-motive force to be generated in the armatures which would restrain the rush of current.

According to this invention there is provided in the circuit of the shunt resistance or path around the series field windings, a switch which is so arranged and controlled that as soon as the circuit through the field windings is interrupted, the said switch is caused to promptly open the circuit through the said shunt resistance or path and is restrained from closing the circuit again until after a certain time period has elapsed, that is to say until after the series field has gained considerable strength.

In order that the said invention may be clearly understood and readily carried into effect, it will now be described more fully with reference to the accompanying drawings in which:—

Figure 1 represents four stages in the change of relationship of the armatures from full parallel to series-parallel in connection with a regenerative system of motor control based on the open circuit principle in accordance with this invention. Fig. 2 represents four stages in the change of relationship of the armatures from series-parallel to full series. Figs. 3 and 4 are diagrams representing stages in the change of relationship from full series to series-parallel and from series-parallel to full parallel respectively as applied to series motors controlled by field variation in connection with double series-parallel control. It will be understood that in Figs. 1 and 2 the changes are those which take place in operating the controller to cause a decrease in speed of the motors and that in Figs. 3 and 4 the changes are such as take place in increasing the speed of the motors. Figs. 5 and 6 are diagrams showing modifications of the manner in which the switch herein described may be controlled.

A A represent the motor armatures, B B the series field windings, C C resistance in shunt around said windings B, and D D the switches for controlling the circuit of the shunt resistance C.

Referring first to Figs. 1 and 2, the switch is adapted to be actuated by an electromagnetic device comprising the core $d$, the solenoid winding $d^1$ and a dash-pot device $d^2$. The solenoid winding $d^1$ is in series with the series field winding B.

If the switch were not employed and the changes in relationship of the armatures were made to take place directly from those shown in stages (a) to those in stages (d) the first rush of current would pass through the non-inductive shunt resistance C and not through the series field windings B, the result being that the series field would almost entirely lose its counter-balancing action on the shunt field due to the shunt field windings E during regeneration. Moreover the rush of current would be still greater owing to the fact that the shunt field does not decrease very rapidly from its full strength by the introduction of the resistances $e$ $e^1$ in the shunt field winding E that occurs when these changes of relationship are made.

By the employment of the switch to control the circuit of the shunt resistance C, the effect is as follows:—In passing from stages (a) to stages (b) the motor armature and field connections are interrupted and the solenoid winding $d^1$ being no longer energized causes the core $d$ to move the switch contact D from its circuit completing position, the dash-pot device $d^2$ being so constructed that this movement takes place promptly and rapidly.

When the motor armature and field connections are again made as shown in stages (c) the solenoid winding $d^1$ is again energized, but the dash-pot device $d^2$ retards the return movement of the core $d$ and switch contact D, so that the circuit of the shunt resistance C is prevented from being instantaneously closed. The first rush of current must therefore pass through the series field windings B and since the backward movement of the controller is being considered, and the motors are assumed to be regenerating, the direction of the current in the series field windings will be opposite to the direction in the shunt field winding E. The shunt field will therefore be neutralized, so that the electromotive force of the generating motors will be reduced and the rush of current thus minimized. In the case in which the motors are taking current from the supply, the direction of current through the series field windings would be the same as that through the shunt field windings, and the series and shunt ampere-turns would combine to energize the field strongly. After the closing of the switch has been delayed a sufficient length of time for the series field to attain the desired strength, said switch becomes closed, and the connections are then as shown in stages (d).

Another circumstance under which the counter-balancing action of the series field would not be utilized if a switch such as herein described were not used, is that in which the trolley of a car might leave the trolley wire or conductor when the car is descending an incline. The electromotive force of the motors would increase with the speed of the car and when the trolley eventually made contact again, the full current would pass through the non-inductive resistance C, and thus be limited only by the ohmic resistance of the circuit instead of by field weakening.

In the system of control represented in Figs. 3 and 4, the changes which take place in passing through the four stages (a), (b), (c) and (d) are similar to those described with reference to Figs. 1 and 2. As above stated the first rush of current that occurs when the motor and field connections are re-made after being interrupted in changing from full series to series-parallel, or from series-parallel to full parallel, or by removal of the trolley from the trolley wire, is caused to pass through the series field windings B, owing to the fact that the circuit of the shunt resistance C is temporarily kept open. The return movement of the switch may be controlled by other means than a dash-pot device.

In Fig. 5 the switch is shown as being controlled by the solenoid winding $d^1$ in conjunction with a high resistance coil $d^0$ connected across the series field winding B, and wound to produce an effect opposite to that of the said solenoid winding $d^1$. At the moment when the motor armature and field connections are completed, the voltage across the series field winding will be high and a comparatively strong current will pass through the counteracting coil $d^0$ and thus balance the current in the solenoid coil $d^1$, thereby preventing the switch from closing until after the current through the series field winding has reached its normal strength. A modification of this method of controlling the switch is shown in Fig. 6, in which the counteracting coil $d^0$ forms part of an independent circuit having a winding $d^x$ arranged inductively with respect to the series field winding B, so that directly the armature and field connections are completed, the transformer action between the series field winding B and the coil $d^x$, due to the rush of current through the series field winding and the building up of the series field, causes the coil $d^0$ to become temporarily energized and thus counteract the effect of the solenoid winding $d^1$. Other appropriate means may be employed to control the switch which should be made to open promptly and be suitably retarded in closing.

What I claim and desire to secure by Letters Patent of the United States is:—

1. The described method of controlling a plurality of electric motors in a system of electrical supply consisting in shunting part of the working current around series field windings of the individual motors when desired, and in automatically interrupting such individual shunts whenever the current supply to such individual motors is interrupted, and finally in sluggishly restoring the shunt effect when the working current is closed.

2. In a system of electrical supply a plurality of electrical motors having their armatures and field magnets located in series relation therewith; a shunted resistance around each field magnet of each motor normally held in closed circuit when the working current is closed through the motors; in combination with a plurality of electromagnetic controlling devices located in such shunt circuits, each of such controlling devices being provided with a retarding device and the entire arrangement such that when the working circuit is broken to any one motor the shunt circuit thereof is likewise broken.

3. In a system of electrical supply a plurality of electrical motors having their armatures and field magnets located in series relation therewith; a shunted resistance around each field magnet of each motor normally held in closed circuit when the working current is closed through the motors; in combination with a plurality of electromagnetic controlling devices located in such shunt circuits, each of such controlling devices being provided with a retarding device and the entire arrangement such that when the working circuit is broken to any one motor the shunt circuit thereof is likewise broken; together with a plurality of resistances located in shunt around the entire motor system.

4. In a system of electrical supply a plurality of electrical motors each having field windings in series relationship to the armature; resistances capable of being shunted around series field windings of each motor; in combination with a plurality of electromagnetic controlling devices controlling such shunt circuits, each controlling device being provided with a retarding device and the entire arrangement such that when the working circuit is broken to any one motor the shunt circuit around its series field windings is automatically interrupted and is sluggishly restored when the working circuit is again closed.

In testimony whereof I affix my signature in presence of two witnesses.

JOHAN GUSTAF VIKTOR LANG.

Witnesses:
 T. SELBY WARDLE,
 GEORGE S. BRIDGES.

---

Copies of this patent may be obtained for five cents each, by addressing the "Commissioner of Patents, Washington, D. C."